(12) United States Patent
Severin

(10) Patent No.: US 7,926,334 B2
(45) Date of Patent: Apr. 19, 2011

(54) TAMPERPROOF AND CALIBRATION DEVICE, ESPECIALLY FOR A TURBOCHARGER WITH A VARIABLE NOZZLE DEVICE

(75) Inventor: Emmanuel Severin, Thaon les Vosges (FR)

(73) Assignee: Honeywell International Inc., Morristown, NJ (US)

( * ) Notice: Subject to any disclaimer, the term of this patent is extended or adjusted under 35 U.S.C. 154(b) by 882 days.

(21) Appl. No.: 10/555,622

(22) PCT Filed: May 6, 2003

(86) PCT No.: PCT/EP03/04757
§ 371 (c)(1),
(2), (4) Date: Feb. 7, 2008

(87) PCT Pub. No.: WO2004/053299
PCT Pub. Date: Jun. 24, 2004

(65) Prior Publication Data
US 2010/0089055 A1    Apr. 15, 2010

(51) Int. Cl.
*G01M 15/00* (2006.01)
(52) U.S. Cl. .................................................. 73/114.77
(58) Field of Classification Search .............. 73/112.01, 73/112.03, 114.31, 114.38, 114.77
See application file for complete search history.

(56) References Cited

U.S. PATENT DOCUMENTS

| 2,886,088 | A | | 5/1959 | Brancato | |
| 3,039,007 | A | * | 6/1962 | Williams et al. | 290/52 |
| 3,390,591 | A | | 7/1968 | Wood et al. | |
| 4,232,978 | A | | 11/1980 | Cohen | |
| 4,780,054 | A | | 10/1988 | Yano et al. | |
| 4,810,165 | A | * | 3/1989 | Greune et al. | 415/156 |
| 5,771,695 | A | * | 6/1998 | Halimi | 60/608 |
| 6,883,317 | B2 | * | 4/2005 | Heath | 60/602 |
| 7,165,401 | B2 | * | 1/2007 | McEwen et al. | 60/602 |
| 2007/0183889 | A1 | * | 8/2007 | Bromann | 415/160 |

FOREIGN PATENT DOCUMENTS

| EP | 1120546 A2 | 8/2001 |
| JP | 63143323 | 6/1988 |

* cited by examiner

*Primary Examiner* — Eric S McCall
(74) *Attorney, Agent, or Firm* — Brian Pangrle

(57) ABSTRACT

A tamperproof and calibration device comprises an adjusting member for adjusting the position of a first element in respect to a second element in a direction which is different from another direction in which a fixing member acts for fixation of the first element with respect to the second element. The tamperproof and calibration device is applicable to a turbocharger comprising a variable nozzle device coupled with an actuated member to be actuated by an actuator, wherein the tamperproof and calibration device connects the actuated member with the actuator for calibration of the relative position of the actuated member of the variable nozzle device with respect to a predetermined position of the actuator.

10 Claims, 3 Drawing Sheets

TAMPERPROOF AND CALIBRATION DEVICE, ESPECIALLY FOR A TURBOCHARGER WITH A VARIABLE NOZZLE DEVICE

TECHNICAL FIELD

Technologies described herein generally relate to a tamperproof and calibration device for adjusting and fixing of two elements with respect to each other. Various technologies relate also to a turbocharger using such a device.

BACKGROUND

Conventional turbochargers with a variable nozzle device, as for an engine of a vehicle, include for instance an actuating member connected to a lever mechanism or the like, which is in turn connected to the variable nozzle device. By actuating the actuating member in e.g. a pure linear direction a lever mechanism' transforms the linear movement of the actuating member into a rotation of a rotary axis of the variable nozzle device. The actuating member is actuated by an actuating device. The actuating device includes a rod, or suchlike, which is connectable to the actuating member and which is movable in the above linear actuating direction by the actuating device. For establishing a neutral position of the variable nozzle device the distance between the actuating device and the actuation member has to be calibrated and fixed in the linear actuating direction.

From the document EP 1 120 546 A2 there is known a turbocharger with a variable nozzle device actuated by an actuating member which is actuatable by an actuating device. The actuating member has a female thread for engagement with a male thread of a rod end being part of the actuating device. Thus, a screwed joint is formed. The screwed joint is locked by a counter nut. The counter nut acts in a direction of a linear movement of the actuating device so that tightening of the counter nut may cause a change of a calibration distance. Further, a comparatively high torque is necessary to lock the screwed joint. A loosening of the nut by motor vibrations or by intervention during maintenance may happen.

SUMMARY

An improved tamperproof and calibration device facilitating mounting and calibration as well as making erroneous loosening difficult is described herein and may be achieved by the combination of the features including an adjusting member for adjusting the position of a first element in respect to a second element in a direction which is different from another direction in which a fixing member acts for fixation of the first element with respect to the second element.

According to the technical solution described herein, a tamperproof and calibration device for adjusting and fixing of two elements to each other includes an adjusting member for adjusting the position of a first element in respect to a second element in a predetermined direction. This direction is different from another direction in which a fixing member acts for fixation of the first element with respect to the second element. Advantageously, the tightening of the fixing member in another direction as the calibration direction prevents the calibration from being influenced by the fixing process.

Further, it is preferable that the relative position of the first element and the second element to each other is adjustable in a linear direction.

According to an embodiment of the tamperproof and calibration device or system, the adjusting member is rotatably supported on said second element and threaded on the first element. This enables a simple calibration of the tamperproof and calibration system by rotating the adjusting member.

Furthermore, the first element is advantageously provided with a male thread extending through a hole of the second element for co-operating with a screw serving as a fixing member. The co-operation of the screw with the male thread enhances the fixation of the first element with the second element.

The adjusting member is formed as a nut so that the calibration may be performed manually or with a tool in a simple manner.

In a further embodiment of the tamperproof and calibration device, the nut has a flange portion being freely rotatable engaged in a circumferential groove formed in the through hole of the second element. Therefore, a simple connection between the second element and the nut is provided. Further, during mounting of the first element to the second element, the nut need not to be held by a mechanic.

Further, the tamperproof and calibration device includes advantageously the second element which is made of sheet metal constituting two shells which represent a housing member for the nut. Through this, the nut can be easily mounted to the second element.

The screw is to be screwed into a screwhole, which is radial to the through hole of the second element, for pressing the first element against an inner wall of the through hole of the second element so that the calibration can be fixed in a simple manner.

A tamperproof and calibration device is used in a turbocharger including a variable nozzle device coupled with an actuated member to be actuated by an actuator. The tamperproof and calibration device connects advantageously the actuated member with the actuator for calibration of the relative position of the actuated member with respect to a predetermined position of the actuator.

Advantageously, the actuated member is a crank which is hinged on the tamperproof and calibration device wherein the tamperproof and calibration device represents a stiff extension of a rod transmitting an actuating force from the actuator. Thus, the axial actuating force of the actuator can be easily transmitted to the crank as well as transformed into a rotational force acting on the variable nozzle device.

Moreover, the crank is hinged on a portion of said tamperproof and calibration device located on the axis of the portion of said rod which receives the actuating force from the actuator. Thereby, the actuating force acts only axial without generating any torque which would cause a bending load on for instance the connection between actuator and rod. Herewith, the design of the respective components can be simpler and lighter.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
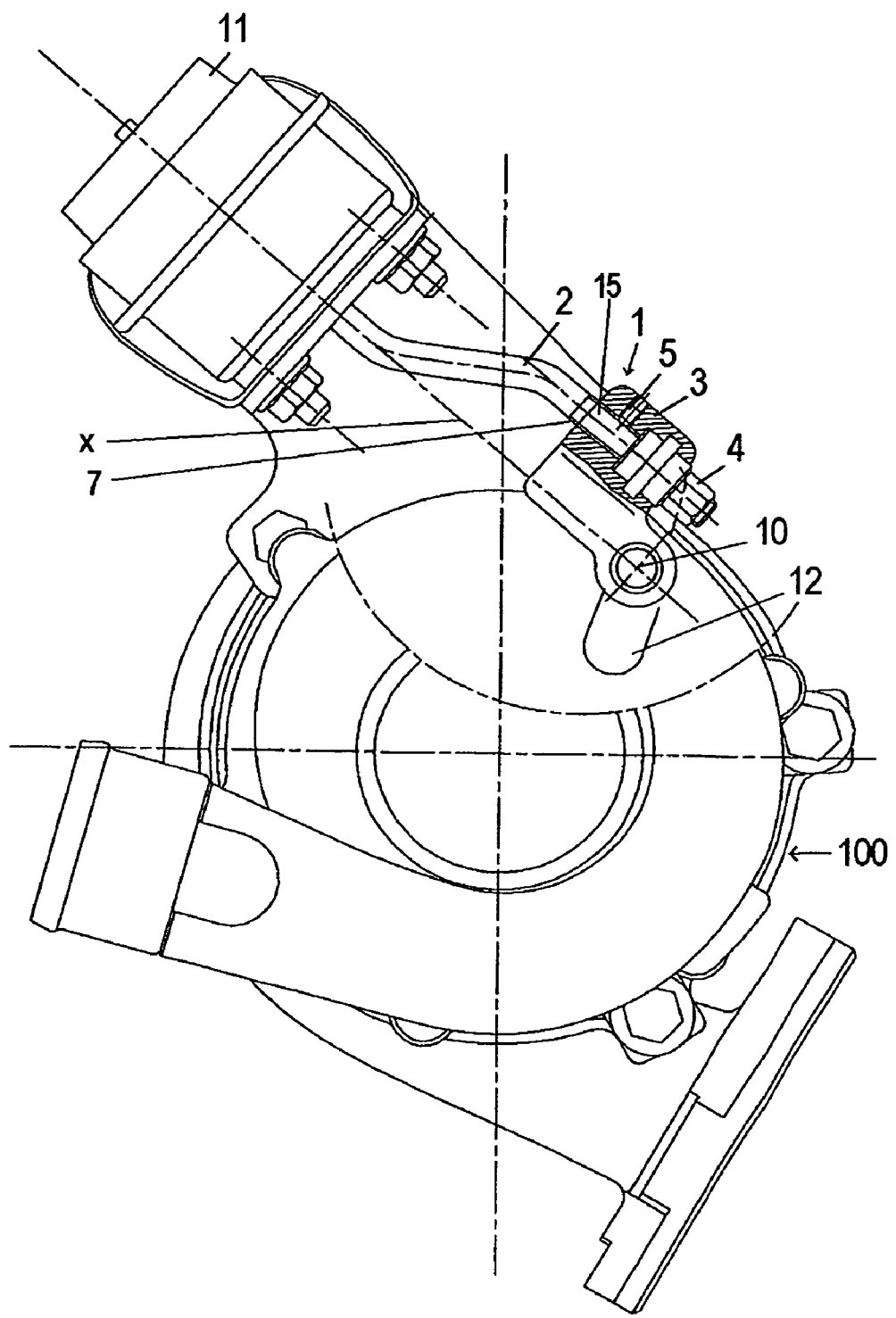
FIG. 1 shows a turbocharger including a tamperproof and calibration device according to a first embodiment.

According to a first embodiment, as illustrated by FIG. 1, a tamperproof and calibration device 1 is provided in a turbocharger 100 for adjustably connecting a rod 2 of an actuator 11 with a crank 12 of a built-in variable nozzle device (not particularly shown in the figure). A connected end 15 of the rod 2 is provided with a male thread 7 and forms a first element of the tamperproof and calibration device which is inserted in a through hole 8 of a cartridge member 3. The cartridge member 3 forms a second element of the tamperproof and calibration device 1. The cartridge member 3 accommodates a freely rotatable nut 4 as an adjusting member screwed on the connected end 15 and a headless screw 5 representing a fixing member threaded in a radial direction toward the connected end 15 of the rod 2. Thus, the nut 4 serves for adjusting the position of the connected end 15 in respect to the cartridge member 3 in a linear direction which is different from the direction in which the headless screw 5 acts as a fixing member for firmly fixing the position of the first element 15 with respect to the cartridge member 3.

Figure 2:
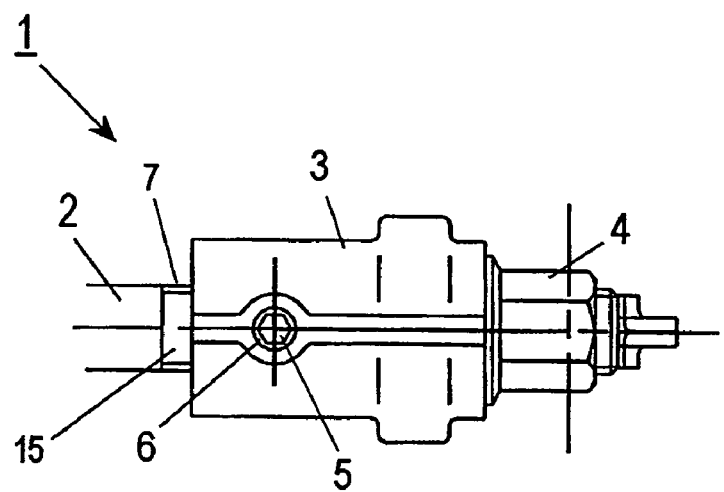
FIG. 2 is a top view of the tamperproof and calibration device shown in FIG. 1.
Figure 3:
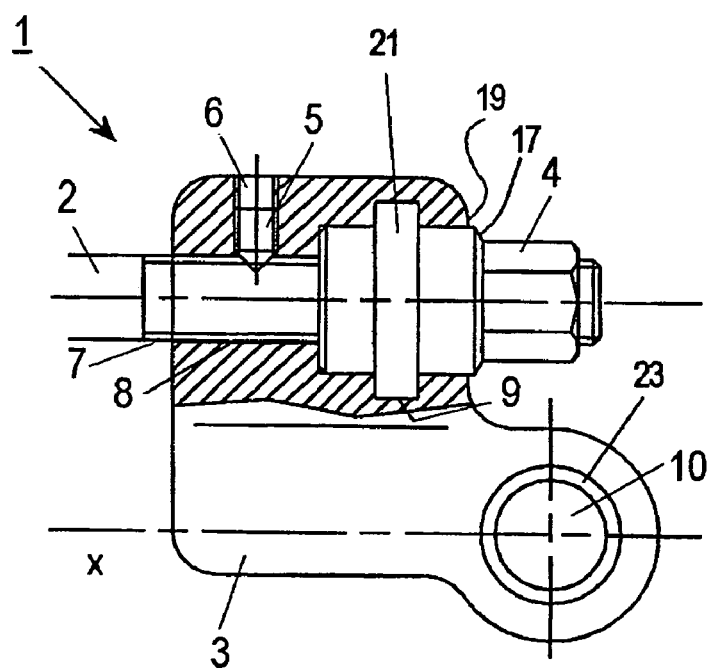
FIG. 3 is a partial cross-sectional side view of the tamperproof and calibration device shown in FIGS. 1 and 2.

Further particularities of the construction of the tamperproof and calibration device of the first embodiment can be gathered from the illustration in FIGS. 2 and 3.

The cartridge member 3 is connected to the variable nozzle device via the crank 12 and a lever mechanism (not illustrated in the figures) which transforms a linear movement of the cartridge member 3 into a rotational movement of the variable nozzle device. This means that the rod 2 with the cartridge member 3 connecting the actuator 11 with the crank 12 is able to perform a linear movement for rotating the crank 12 which is rotatably arranged on the housing of the turbocharger 100. The axis of an actuated end of the rod 2 receiving the actuating force from the actuator 11 is offset from the axis of the connected end 15 of the rod 2 forming the first element of the tamperproof and calibration device 1 by a distance which is the same as the distance by which a hinge receiving portion 10 of the cartridge member 3 is offset from the axis of the connected end 15, so that the hinge receiving portion connecting the cartridge member 3 with the crank 12 is located on a virtual extension X of the axis of the end of the rod 2 receiving the actuating force from the actuator 11 as shown in FIG. 1. For achieving such an arrangement the middle portion of the rod 2 is bent twice. The actuated end of the rod 2 and the connected end 15 of the rod 2 are parallel to each other and parallel to the direction of the linear movement performed by an actuator 11.

Referring to FIG. 2 and FIG. 3, the cartridge member 3 includes two arms in a L-shape. A first arm is provided with the through hole 8 for receiving the connected end 15. The through hole 8 has a small diameter portion at a first side from where the connected end 15 is inserted, and at a second side a large diameter portion having a ring-shaped circumferential groove 9. The inner diameter of the small diameter portion of the through hole 8 is approximately the same as the outer diameter of the connected end 15 so that the connected end 15 can be fitted into the through hole 8.

The through hole 8 is provided at its large diameter portion with the nut 4 forming an adjusting member of the tamperproof and calibration device 1. The nut 4 has a cylindrical portion for fitting into the large diameter portion of the through hole, a flange portion 21 provided on a middle portion of the cylindrical portion for fitting in the circumferential groove 9 and a handling portion for receiving a tool or for being manually operated. The handling portion has a hexagonal head which diameter is smaller than the diameter of the cylindrical portion. The nut 4 is rotatably engaged with the large diameter portion of the through hole 8 of the cartridge member 3. The flange portion 21 of the nut 4 is received in the groove 9 of the large diameter portion of the through hole 8. Thus, while the nut 4 remains secured in the axial direction of the through hole 8, it is freely rotatable in the radial direction. The hexagonal head of the nut 4 protrudes from the cartridge member 3 at the side of the large diameter portion of the through hole 8 and is accessible for a tool or the like.

For accommodating the headless screw (grub screw) 5 forming the fixing member of the tamperproof and calibration device 1 there is provided a radial screwhole 6 in the first arm of the cartridge member 3 which extends radially from the outside of the first arm into the through hole 8. Thus, the headless screw 5 can be screwed only by a tool so as to push against the connected end 15 of the rod 2, which means in particular to engage with the male thread 7 of the connected end 15 of the rod 2 and to fix the rod 2 axially and radially with respect to the cartridge member 3.

The cartridge member 3 consists of two shells made of sheet metal. By providing the two shells the cartridge member 3 can be manufactured in an efficient manner, wherein during assembling the nut 4 is first accommodated in the through hole 8 before fixing the two shells together by, for instance, welding or screwing. Then, the radial screwhole 6 and the hinge receiving portion 10 are machined.

The hinge receiving portion 10 is an axial bore being vertical to a plane including the two arms of the cartridge member 3. In the axial bore, a bushing 23 is accommodated which supports rotatably a pin which is fixed to the crank 12. Hence, the crank 12 can rotate on the cartridge member 3.

In the present embodiment the adjusting nut 4 is preferably provided with a visible conical ring portion 17 provided with marks at the circumference thereof and appropriately corresponding to further marks provided on a background surface 19 of the cartridge member 3 for easy identifying of respective calibration positions of the nut 4.

In the following, the function and operation of the tamperproof and calibration device 1 according to the first embodiment of the invention will be described. For calibration purposes the axial distance from the actuator 11 to the hinge receiving portion 10 of the cartridge member 3 has to be adjusted during assembling or maintenance. This distance is adjusted by turning the nut 4, which is screwed on the male thread 7 of the connected end 15 of the rod 2, until the desired distance between these two elements is obtained. This adjustment can easily be performed by using a tool or by operating the nut manually, because the necessary torque for adjustment is comparatively low.

For fixing the rod 2 in the adjusted position, the headless screw 5 is turned until the tip end of the headless screw 5 is pressed against the circumference of the connected end 15 of the rod 2 and engages with the male thread 7 so that the rod 2 is axially and radially fixed in the through hole 8 of the cartridge member 3. The fixing operation can be executed in a simple manner by using a screwdriver or the like. As a tool like the screwdriver does not need much space, as it is long and thin, the access for a mechanic is easy, even though the whole tamperproof and calibration device 1 is incorporated in a narrow space in an engine compartment of a vehicle. A comparatively low torque is sufficient to fix the rod 2 with the headless screw 5 to the cartridge member 3 so that the probability of loosening of the rod 2 due to vibrations, or suchlike, and therefore an unintentional variation of the adjusted distance can be efficiently prevented.

When during the operation of the turbocharger 100 it is intended to change the geometry of the turbocharger 100, the rod 2 is moved by the actuator 11 in its axial direction. The rod 2 which is firmly secured to the cartridge member 3 transmits the axial force to the crank 12 which is rotated, whereby the geometry of the turbocharger 100 by turning the variable nozzle device is adjusted.

Hereinafter, a second embodiment is described with reference to FIG. 4. In the second embodiment reference signs corresponding to reference signs in the first embodiment are used, such as 101 corresponding to 1 in the first embodiment.

Figure 4:
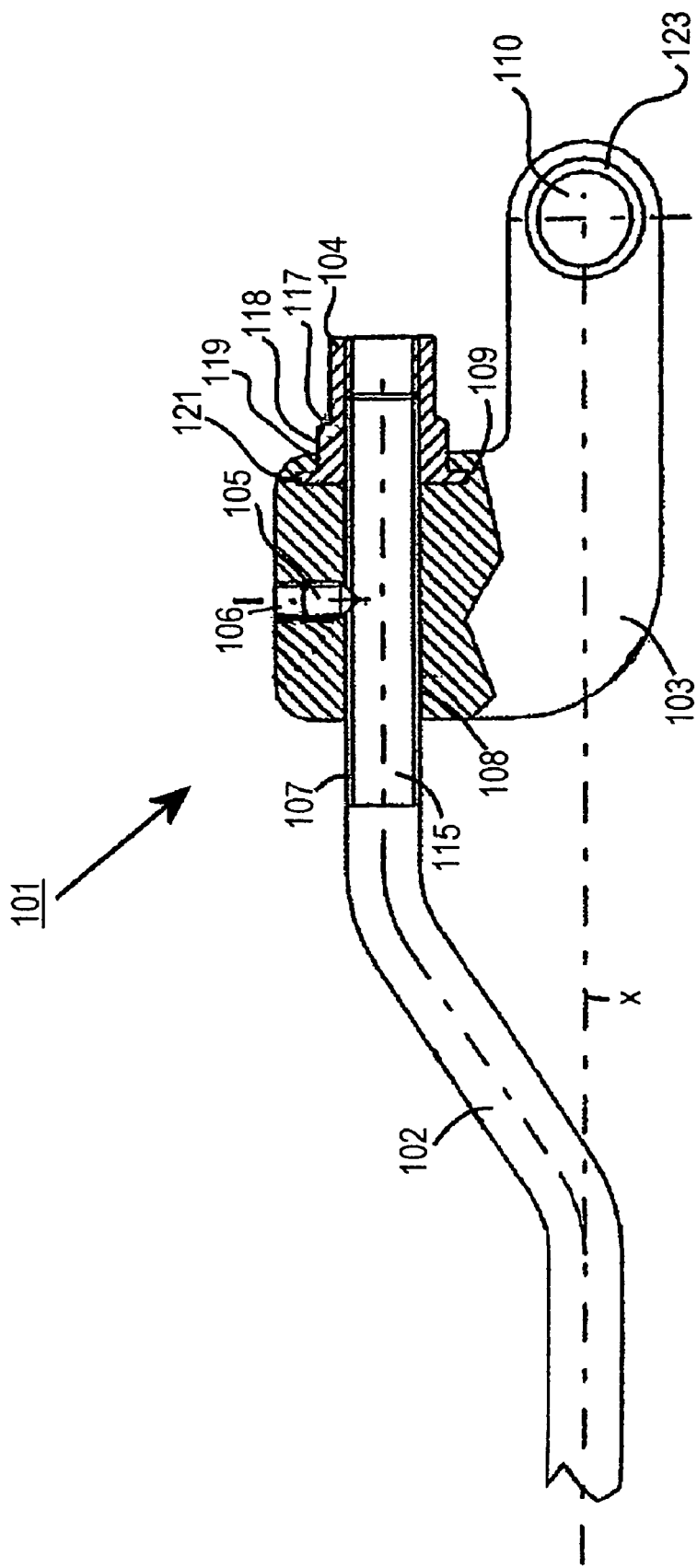
FIG. 4 is a partial cross-sectional side view of a tamperproof and calibration device according to a second embodiment.

Similar to FIG. 3, FIG. 4 is an illustration of a tamperproof and calibration device 101 according to the second embodiment. The tamperproof and calibration device 101 includes a connected end 115 of a rod 102 with a male thread 107, a cartridge member 103 in a L-shape having a first arm provided with a through hole 108 and a screwhole 106 extending radial thereto and a second arm provided with an hinge receiving portion 110, a nut 104 for adjusting the rod 102 with respect to the cartridge member 103 and a screw 105 for fixation of the connected end 115 of the rod 102.

The second embodiment is similar to the first embodiment. However, the second arm of the cartridge member 103 is elongated so that the hinge receiving portion 110 is further displaced apart from an actuator on an axis X. The first arm of the cartridge member 103 has an elongated through hole 108. The through hole 108 is provided with a small diameter portion and a large diameter portion. The small diameter portion is with respect to the large diameter portion considerably longer. Through this, the connected end 115 of the rod 102 is supported over a long distance. The large diameter portion is provided with an undercut 109 forming a circumferential groove. In turn, the nut 104 includes at one side a small diameter portion with e.g. an hexagonal head for receiving a tool or the like and at the other side a large diameter portion 118 with a flange portion 121. The flange portion 121 is arranged at an end of the large diameter portion 118 which is opposite to an end adjacent to the small diameter portion. The nut 104 is accommodated in the large diameter portion of the cartridge member 103 wherein the flange portion 121 engages with the undercut 109. The small diameter portion of the nut 104 and a part of the large diameter portion protrude from the cartridge member 103. Calibration marks are in contrary to the first embodiment provided on the large diameter portion 118 which protrudes from the cartridge member 103. In the present embodiment the adjusting nut 104 is preferably provided with a conical ring portion 117 and the cartridge member 103 preferably includes a background surface 119 and a bushing 123.

The function and operation of the tamperproof and calibration device 101 is similar to the corresponding device described in the first embodiment.

The invention is not restricted to the above described embodiments.

The application of the tamperproof and calibration device is not restricted to the technical field of turbochargers, but it is applicable in other mechanisms where a distance between a first and a second element is to be reliably adjusted, particularly in vehicles where such kind of devices are exposed to vibrations.

The tamperproof and calibration device according to the invention can be also useful for adjusting an angle between two elements. Also, the adjusting member could be e.g. a raster mechanism instead of a nut. Further, the fixing member could be any kind of a screw or any clamp mechanism which acts in another direction as the adjusting member. The nut as the adjusting member could also be attached to the other side of the through hole of the cartridge member. The rod and the cartridge member could also perform a movement combining a linear and a rotary movement when actuated by the actuator.

The invention claimed is:

1. A variable nozzle device coupled with an actuated member (12) to be actuated by an actuator (11) characterized by a tamperproof and calibration device (1) connecting the actuated member (12) with the actuator (11) for calibration of the relative position of the actuated member (12) of the variable nozzle device with respect to a predetermined position of the actuator (11), the tamperproof and calibration device (1) comprising:
 an adjusting member (4) for adjusting the position of a first element (15) in respect to a second element (3) in a first direction, the adjusting member (4) rotatably supported in the second element (3) and threaded on the first element (15); and
 a fixing member (5) that acts for fixation of the position of the first element (15) with respect to the second element (3), the fixing member (5) directed in a second direction that differs from the first direction.

2. The system according to claim 1, wherein the relative position of the first element (15) and the second element (3) to each other is adjustable in a linear direction.

3. The system according to claim 1, wherein the first element (15) is provided with a male thread extending through a hole (8) of the second element (3) for co-operating with a screw serving as a fixing member (5).

4. The system according to claim 3, wherein the screw (5) is screwed into a screwhole (6) extending in radial direction with respect to the through hole (8) of the second element (3) for pressing the first element (15) against the inner wall of the through hole (8).

5. The system according to claim 3, wherein the adjusting member (4) is formed as a nut.

6. The system according to claim 5, wherein the nut (4) has a flange portion (21) being axially engaged and freely rotatable in a circumferential groove (9) formed in the through hole (8) of the second element (3).

7. The system according to claim 6, wherein the second element (3) is made of two shells formed of sheet metal for constituting a housing member accommodating the nut (4).

8. The system according to claim 1, wherein the actuated member (12) is a crank hinged on the tamperproof and calibration device representing a stiff extension of a rod (2) transmitting an actuating force from the actuator (11).

9. The system according to claim 8, wherein the crank (12) is hinged on a portion (10) of said tamperproof and calibration device located on the axis (X) of the portion of said rod (2) which receives the actuating force from the actuator (11).

10. A tamperproof and calibration device (1) comprising:
 an adjusting member (4) for adjusting the position of a first element (15) in respect to a second element (3) in a first direction, the adjusting member (4) rotatably supported in the second element (3) and threaded on the first element (15); and a fixing member (5) that acts for fixation of the position of the first element (15) with respect to the second element (3), the fixing member (5) directed in a second direction that differs from the first direction, wherein the first element (15) is provided with a male thread extending through a hole (8) of the second element (3) for co-operating with a screw serving as a fixing member (5), wherein the adjusting member (4) is formed as a nut that comprises a flange portion (21) being axially engaged and freely rotatable in a circumferential groove (9) formed in the hole (8) of the second element (3) and wherein the second element (3) is made of two shells formed of sheet metal for constituting a housing member accommodating the nut (4).

* * * * *